United States Patent
Tang

(10) Patent No.: US 7,441,698 B2
(45) Date of Patent: Oct. 28, 2008

(54) METHOD FOR INCREASING SECURITY OF PLAINTEXT AUTHENTICATION IN WIRELESS LOCAL AREA NETWORK

(75) Inventor: Cheng-Wen Tang, Shenzhen (CN)

(73) Assignee: Hon Hai Precision Industry Co., Ltd., Tu-Cheng, Taipei Hsien (TW)

(*) Notice: Subject to any disclaimer, the term of this patent is extended or adjusted under 35 U.S.C. 154(b) by 242 days.

(21) Appl. No.: 11/308,577

(22) Filed: Apr. 8, 2006

(65) Prior Publication Data

US 2006/0294597 A1 Dec. 28, 2006

(30) Foreign Application Priority Data

Jun. 25, 2005 (CN) .................. 2005 1 0035589

(51) Int. Cl.
*G06K 5/00* (2006.01)
(52) U.S. Cl. .................. 235/382; 235/375; 235/487; 713/169
(58) Field of Classification Search .................. 235/375, 235/382, 487; 705/54, 67, 44; 713/168–170
See application file for complete search history.

(56) References Cited

U.S. PATENT DOCUMENTS

| 6,996,714 | B1 | | 2/2006 | Halasz et al. | |
|---|---|---|---|---|---|
| 7,069,433 | B1 | * | 6/2006 | Henry et al. | 713/151 |
| 7,320,070 | B2 | * | 1/2008 | Baum | 713/153 |
| 2002/0174335 | A1 | * | 11/2002 | Zhang et al. | 713/168 |
| 2004/0107360 | A1 | * | 6/2004 | Herrmann et al. | 713/201 |
| 2004/0236702 | A1 | * | 11/2004 | Fink et al. | 705/73 |
| 2006/0185001 | A1 | * | 8/2006 | Stieglitz et al. | 726/4 |
| 2006/0282880 | A1 | * | 12/2006 | Haverinen et al. | 726/3 |
| 2007/0016939 | A1 | * | 1/2007 | Leibovitz et al. | 726/3 |

* cited by examiner

*Primary Examiner*—Thien M. Le
*Assistant Examiner*—Edwyn Labaze
(74) *Attorney, Agent, or Firm*—Wei Te Chung

(57) ABSTRACT

A method for increasing security of plaintext authentication in a wireless local area network (WLAN) is provided. The method includes steps of: establishing a basic service set in the WLAN; establishing a blank learning table for saving identities of faked users; generating the identities of the faked users according to a random hexadecimal string to protect identities of true users; performing a faked extensible authentication protocol process according to the generated identities; determining whether the learning table should be updated; and updating the learning table if the learning table should be updated.

16 Claims, 5 Drawing Sheets

METHOD FOR INCREASING SECURITY OF PLAINTEXT AUTHENTICATION IN WIRELESS LOCAL AREA NETWORK

FIELD OF THE INVENTION

The present invention relates to a method for increasing security of a network, and particularly to a method for increasing security of plaintext authentication in a wireless local area network.

DESCRIPTION OF RELATED ART

Wireless local area network (WLAN) technology has become an integral part of modern computer network architecture, but accompanied with other questions, such as user authentication, security of WLAN, and so on. Because in WLAN, information is transmitted by radio, and hackers may easily receive the radio to steal the information therein, therefore a user must use an authentication method to increase the security to protect the information transmitted over WLAN.

In a conventional authentication of the WLAN, plaintext authentication is employed for authenticating users, such as Lightweight Extensible Authentication Protocol (LEAP), which uses password to authenticates users. However, the LEAP is only applicable for hardware or software of the Cisco or other specific companies, and is prone to suffering from a dictionary attack.

SUMMARY OF INVENTION

According to an exemplary embodiment of the present invention, a method for increasing security of plaintext authentication in a wireless local area network (WLAN) is provided. The method comprises steps of: establishing a basic service set in the WLAN; establishing a blank learning table for saving identities of faked users; generating the identities of the faked users according. to a random hexadecimal string to protect identities of true users; performing a faked extensible authentication protocol process according to the generated identities; determining whether the learning table should be updated; and updating the learning table if the learning table should be updated.

Other advantages and novel features will become more apparent from the following detailed description when taken in conjunction with the accompanying drawings, in which:

DETAILED DESCRIPTION

Figure 1:
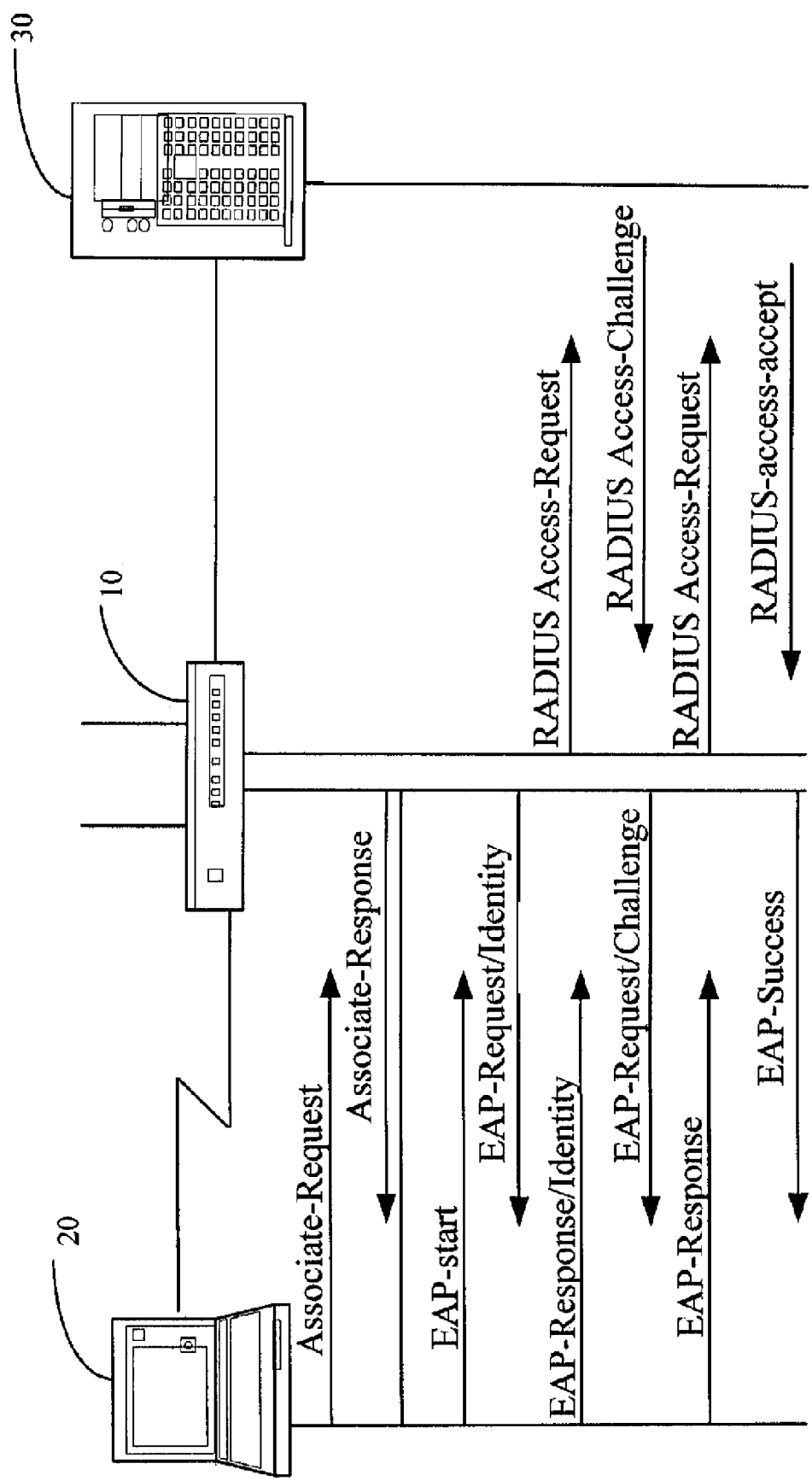
FIG. 1 is a structural schematic diagram of an application environment according to an exemplary embodiment of the invention.

FIG. 1 is a structural schematic diagram of an application environment according to an exemplary embodiment of the invention. In the exemplary embodiment, a basic service set (BSS) includes an access point 10, a client 20, and a server 30. The client 20 is connected with the access point 10, and the access point 10 is connected with the server 30, thus a communication between the client 20 and the server 30 is established. In the exemplary embodiment, the server 30 is an authentication server.

When the BSS begins operating, the client 20 transmits an Associate-Request to the access point 10 for establishing a communication with the server 30. The access point 10 then feeds back an Associate-Response to the client 20, which indicates whether the access point 10 accepts the Associate-Request. If yes, the communication between the client 20 and the server 30 is established, and the BSS enters an Extensible Authentication Protocol (EAP) process.

In the EAP process, the access point 10 acts as a communication medium between the client 20 and the server 30. Firstly, the client 20 transmits an EAP-start frame to the access point 10. The EAP-start frame is used for showing the BSS has come into an EAP process. Upon receiving the EAP-start frame, the access point 10 transmits an EAP-Request/Identity frame, which requests the client 20 to transmit user identity information. The client 20 then transmits an EAP-Response/Identity frame that includes the user identity information to the access point 10. The access point 10 encapsulates the user identity information in a Remote Authentication Dial-In User Service (RADIUS) Access-Request frame, and transmits the RADIUS Access-Request frame to the server 30. After receiving the RADIUS Access-Request frame, the server 30 transmits a RADIUS Access-Challenge frame that includes an EAP-Request/Challenge frame to the access point 10. The EAP-Request/Challenge frame is used for requesting the client 20 to respond a challenge to the server 30. In the exemplary embodiment, the EAP-Request/Challenge frame includes a string. The access point 10 then transmits the EAP-Request/Challenge frame to the client 20. The client 20 processes the string in the EAP-Request/Challenge frame and transmits an EAP-Response frame that includes the string processed by the client 20 to the access point 10. The access point 10 transmits a RADIUS Access Request frame that includes the EAP-Response frame and the EAP-Request/Challenge to the server 30. The server 30 determines whether the user identity information is legitimate. If the user identity information is legitimate, the server 30 transmits a RADIUS-access-accept frame to the access point 10. Upon receiving the RADIUS-access-accept frame, the access point 10 transmits an EAP-Success frame to the client 20. In the EAP process, the partie receiving frames automatically generates an acknowledgement (ACK) frame to the partie transmitting frames after each frame is successfully transmitted.

In the present invention, the access point 10 generates all the frames to build a covering for the true user and enforce protection against a dictionary attack, thereby preventing an attacker from obtaining true information.

In the exemplary embodiment, once the access point 10 starts operating, identities of faked users are generated.

Figure 2:
FIG. 2 illustrates a learning table according to an exemplary embodiment of the invention.

FIG. 2 illustrates a learning table 110, which is used for generating the identities of the faked users. The learning table 110 includes a user identity type column, a true user number column, a faked user number column, a true user identity column and a faked user identity column. In the exemplary embodiment, the user identity type includes Message-Digest Algorithm 5 (MD5), Lightweight Extensible Authentication Protocol (LEAP), Microsoft Challenge Authentication Protocol v2 (MSCHAP-v2) and so on.

In the exemplary embodiment, the access point 10 generates fifteen faked users to protect one true user. Because no connection is established between the client 20 and the access point 10 at the initialization phase of the access point 10, the number of true users in the learning table 110 is zero, and the column of "True User Identity" is blank. The access point 10 uses a string regarded legitimate by ordinary attackers to generate fifteen faked user identities and stores them in the learning table 110. In the exemplary embodiment, the string is a hexadecimal string. The number of faked users in the learning table 110 can be updated automatically. For example, in the LEAP, if the number of true users is N, wherein N is an integer (1, 2, 3 . . . ), the access point 10 generates faked users for each true user, ie. the access point 10 further generates 15 N faked users. Thus the number of faked user in the learning table 110 is [15*(N+1)].

The access point 10 performs the EAP process according to the faked user identities of the learning table 110. When the client 20 tries to communicate with the server 30 employing one of the user identity types, if the access point 10 receives an access accept frame from the server 30, the access point 10 compares the user identity with those in the learning table 110. If the user identity does not exist in the learning table 110, the access point 10 learns the new client 20. The access point 10 then records the user identity and the user identity type in the learning table 110, and updates the number of faked users. The access point 10 performs the EAP process according to the updated learning table 110. In the embodiment, each faked EAP process is performed every fifteen seconds, and the same principle is applicable to other authentication processes.

In the exemplary embodiment, the access point 10 generates fifteen faked user for each true user, but the invention is not limited to this number. In other embodiments, the number of faked users can be x, wherein x is an integer (1, 2, 3 . . . ), and the access point 10 generates faked users for each true user, ie. The access point 10 further generates x*N faked users. Thus the number of faked user in the learning table 110 is [x*(N+1)].

Figure 3:
FIG. 3 illustrates a time line of a frame of a faked EAP process in different application environments according to an exemplary embodiment of the invention.

FIG. 3 illustrates a time line of a frame of the faked EAP process in different environments. In the exemplary embodiment, the time line can be used in different WLAN environments such as 802.11a, b, or g. In the exemplary embodiment, the fourteen frames are generated in one faked EAP process, the frames includes a faked Associate-Request frame, a faked Associate-Response frame, a faked EAP-Request/Identity frame, a faked EAP-Response/Identity frame, a faked EAP-Challenge frame, a faked Challenge-Response frame, a faked EAP-Success frame, and so on.

Figure 4:
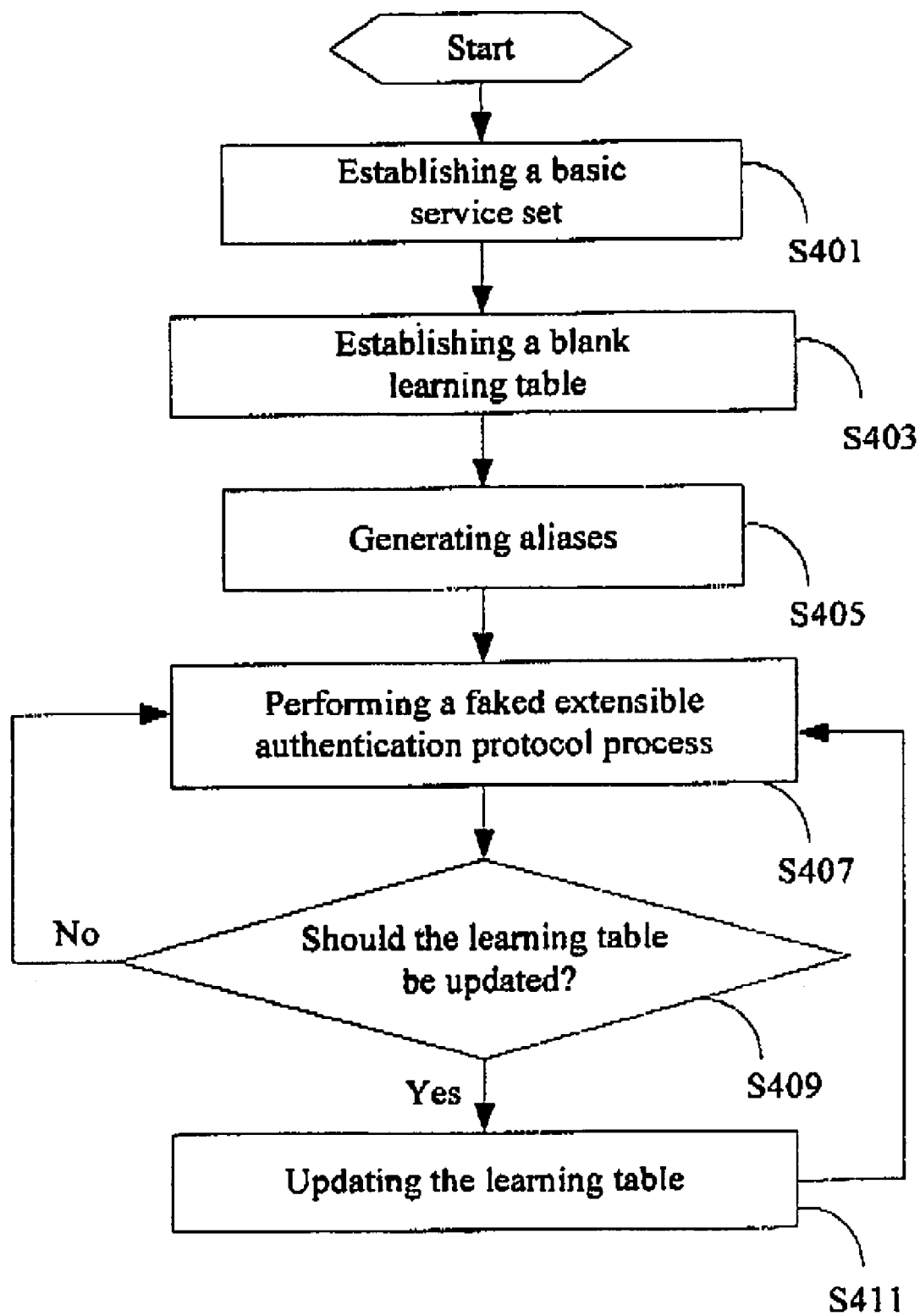
FIG. 4 is a flow chart of increasing security of a method accordance to an exemplary embodiment of the invention.

FIG. 4 is a flow chart of increasing security of a method in accordance with the present invention. In step S401, a basic service set (BSS) is established in the wireless local area network (WLAN). The BSS is used for transmitting data between the client 20 and the server 30. In the exemplary embodiment, the BSS includes the access point 10, the client 20 and the server 30.

In step S403, the access point 10 establishes a blank learning table 110. The learning table 110 is used for generating the identities of the faked users to protect the true users. In the exemplary embodiment, the learning table 110 includes a user identity type column, a true user number column, a faked user number column, a true user identity column and a faked user identity column.

In step S405, the access point 10 generates the identities of the faked users according to a random hexadecimal string to protect the identities of the true users.

In step S407, the access point 10 performs the faked EAP process according to the identities generated in step S405 at a fixed time interval. In the exemplary embodiment, the fixed time interval is fifteen seconds.

In step S409, the access point 10 determines whether the learning table 110 should be updated according to a new user identity from the client 20. If there is a new user identity transmitted from the client 20, the access point 10 updates the learning table 110 in step S411, and then the process returns to step S407. If no new user identity transmitted from the client 20, the process returns to step S407, the access point 10 performs the faked EAP process at the fixed time interval.

Figure 5:
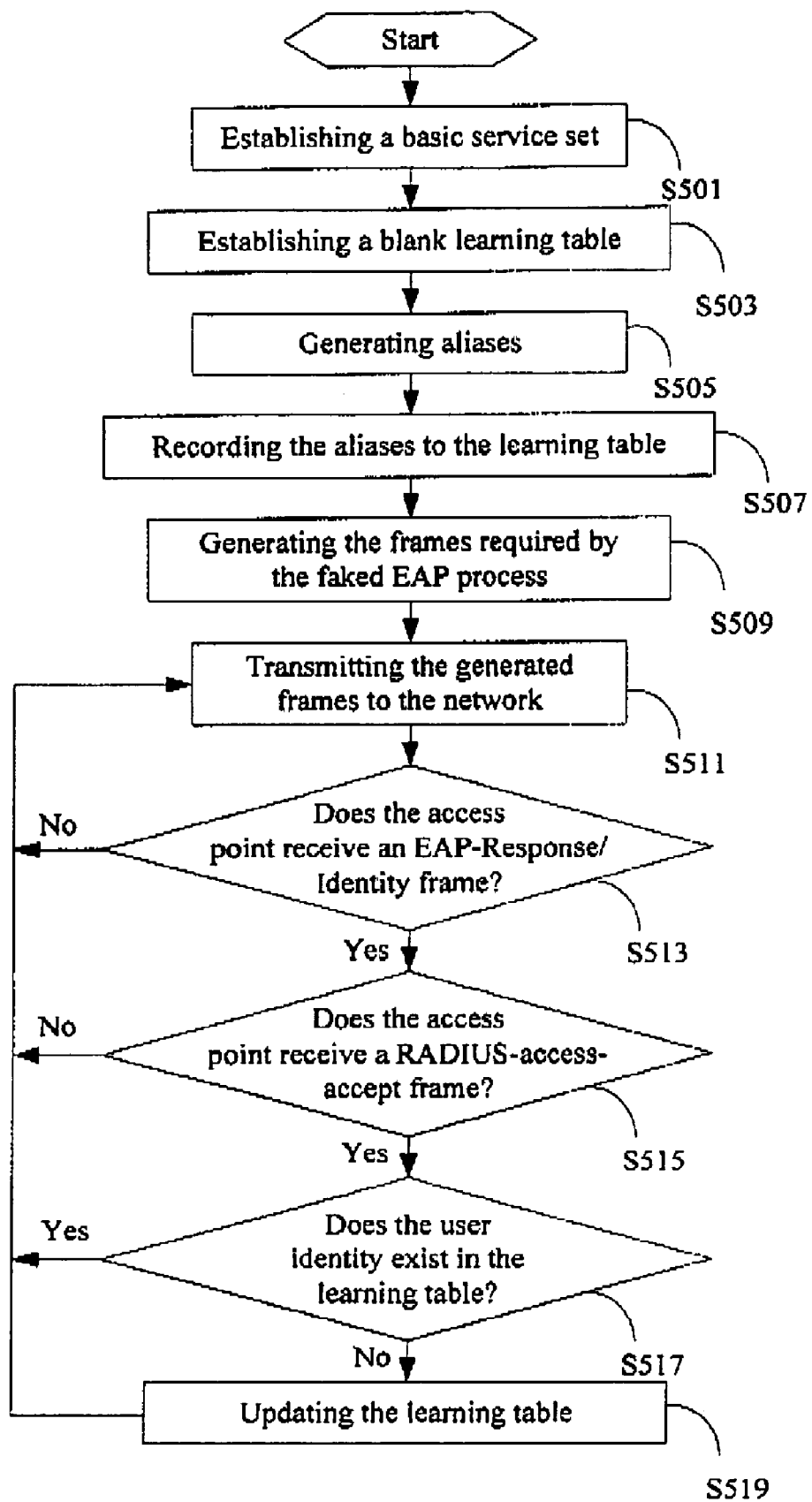
FIG. 5 is a flow chart of increasing security of a method according to another exemplary embodiment of the invention.

FIG. 5 is a flow chart of increasing security of a method in accordance with another embodiment of the present invention. Firstly, the BSS is provided in step S501. The BSS is used for transmitting data between the client 20 and the server 30. In the exemplary embodiment, the BSS includes the access point 10, the client 20 and the server 30.

In step S503, the access point 10 establishes a blank learning table 110. The learning table 110 is used for generating the identities to the faked users to protect the true users. In the exemplary embodiment, the learning table 110 includes a user identity type column, a true user number column, a faked user number column, a true user identity column and a faked user identity column.

In step S505, the access point 10 generates the identities to the faked users according to a random hexadecimal string to protect the identities of the true users.

In step S507, the identities of the faked users are recorded in the learning table 110, and the faked user number column and the faked user identity column of the learning table 110 are updated.

In step S509, the access point 10 initializes the faked EAP process, and generates the frames required by the faked EAP process according to the identities of faked users generated in step S507. In the exemplary embodiment, the identities of the fakes users include the faked Associate-Request frame, the faked Associate-Response frame, the faked EAP-Request/Identity frame, the faked EAP-Response/Identity frame, the faked EAP-Challenge frame, the faked Challenge-Response frame, the faked EAP-Success frame, and seven ACK frames.

In step S511, the access point 10 transmits the frames generated in step S509 to the network at a fixed time interval to perform the faked EAP process. In the exemplary embodiment the fixed time interval is fifteen seconds. The access point 10 transmitting the frame generated in step S509 to the network includes: transmitting a faked Associate-Request wireless frame to the network; transmitting a faked Associate-Response wireless frame to the network; transmitting a faked Extensible Authentication Protocol Request/Identity wireless frame to the network; transmitting a faked Extensible Authentication Protocol Response/Identify wireless frame to the network; transmitting a faked Extensible Authentication Protocol Request/Challenge wireless frame to the network; transmitting a faked Extensible Authentication Protocol Response/Challenge wireless frame to the network; and transmitting a faked Extensible Authentication Protocol success wireless frame to the network.

In step S513, the access point 10 determines whether the client 20 transmits the EAP-Response/Identity frame. If the client 20 does not transmits the EAP-Response/Identity frame to the access point 10, then the process returns to step S511.

In step S515, the access point 10 determines whether the RADIUS-access-accept frame from the server 30 is received, if the client 20 transmits the EAP-Response/Identity frame to the access point 10.

If the RADIUS-access-accept frame from the server 30 is not received by the access point 10, the process returns to step S511.

In step S517, access point 10 determines whether the user identity of the client 20 exists in the learning table 110, if the RADIUS-access-accept frame from the server 30 is received by the access point 10.

If the user identity exists in the learning table 110, then the process returns to step S511.

If the user identity of the client 20 does not exist in the learning table 110, the access point 10 records the user identity and the EAP type in the learning table 110, updates the number of the true users in the learning table 1110 in step S519, and then.

After the access point 10 updates the number of the true users in the learning table 110 in step S519, the process returns to step S511, the access point 10 performs the faked EAP process according to the updated learning table 110.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments.

What is claimed is:

1. A method for increasing security of plaintext authentication in a wireless local area network (WLAN), the method comprising steps of:
   establishing a basic service set in the WLAN;
   establishing a blank learning table for saving identities of faked users;
   generating the identities of the faked users according to a random hexadecimal string to protect identities of true users;
   performing a faked extensible authentication protocol process according to the generated identities;
   determining whether the learning table should be updated; and
   updating the learning table if the learning table should be updated.

2. The method of claim 1, wherein the basic service set comprises a client, an access point, and a server.

3. The method of claim 2, further comprising a step of performing a faked extensible authentication protocol process according to the updated learning table.

4. The method of claim 2, wherein the step of performing a faked extensible authentication protocol process according to the generated identities comprises:
   recording the identities of the faked users to the learning table;
   generating frames required by the faked extensible authentication protocol process; and
   transmitting the generated frames to the network.

5. The method of claim 4, wherein the step of determining whether the learning table should be updated comprises:
   determining whether the access point receives an EAP-Response/Identity frame;
   determining whether the access point receives a RADIU-access-accept frame, if the access point receives the EAP-Response/Identity frame;
   determining whether a user identity of the client exists in the learning table, if the access point receives the EAP-Response/Identity frame; and
   updating the learning table, if the user identity of the client does not exist in the learning table.

6. The method of claim 5, wherein the access point transmits the generated frames to the network, if the access point does not receive the EAP-Response/Identity frame from the client.

7. The method of claim 5, wherein the access point transmits the generated frames to the network, if the access point does not receive the RADIU-access-accept frame.

8. The method of claim 5, wherein the access point transmits the generated frames to the network, if the user identity does not exist in the learning table.

9. The method of claim 4, wherein the step of transmitting the generated frames to the network comprises transmitting a faked Associate-Request wireless frame to the network.

10. The method of claim 9, wherein the step of transmitting the generated frames to the network further comprises transmitting a faked Associate-Response wireless frame to the network.

11. The method of claim 10, wherein the step of transmitting the generated frames to the network further comprises transmitting a faked Extensible Authentication Protocol Request/Identity wireless frame to the network.

12. The method of claim 11, wherein the step of transmitting the generated frames to the network further comprises transmitting a faked Extensible Authentication Protocol Response/Identify wireless frame to the network.

13. The method of claim 12, wherein the step of transmitting the generated frames to the network further comprises transmitting a faked Extensible Authentication Protocol Request/Challenge wireless frame to the network.

14. The method of claim 13, wherein the step of transmitting the generated frames to the network further comprises transmitting a faked Extensible Authentication Protocol Response/Challenge wireless frame to the network.

15. The method of claim 14, wherein the step of transmitting the generated frames to the network further comprises transmitting a faked Extensible Authentication Protocol success wireless frame to the network.

16. The method of claim 1, wherein the learning table comprises a true user number column, a true user identity column, a faked user number column, and a faked user identity column.

* * * * *